US012552002B2

(12) United States Patent
Davis et al.

(10) Patent No.: US 12,552,002 B2
(45) Date of Patent: Feb. 17, 2026

(54) SYSTEMS AND METHODS FOR POWER TOOL COMMUNICATION

(71) Applicant: Milwaukee Electric Tool Corporation, Brookfield, WI (US)

(72) Inventors: Anthony M. Davis, Brookfield, WI (US); Chad E. Jones, Jackson, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 37 days.

(21) Appl. No.: 18/690,139

(22) PCT Filed: Sep. 9, 2022

(86) PCT No.: PCT/US2022/043038
§ 371 (c)(1),
(2) Date: Mar. 7, 2024

(87) PCT Pub. No.: WO2023/039151
PCT Pub. Date: Mar. 16, 2023

(65) Prior Publication Data
US 2024/0399553 A1 Dec. 5, 2024

Related U.S. Application Data

(60) Provisional application No. 63/242,727, filed on Sep. 10, 2021.

(51) Int. Cl.
*B25F 5/00* (2006.01)
*H04L 67/62* (2022.01)

(52) U.S. Cl.
CPC ............... *B25F 5/00* (2013.01); *H04L 67/62* (2022.05)

(58) Field of Classification Search
CPC ............ B25F 5/00; H04L 67/62; H04L 67/12
See application file for complete search history.

(56) References Cited

U.S. PATENT DOCUMENTS

| | | | | |
|---|---|---|---|---|
| 2002/0161788 A1* | 10/2002 | McDonald | ............. | H04L 51/42 707/999.203 |
| 2011/0235563 A1* | 9/2011 | Tinnakornsrisuphap | | ................... H04L 67/02 370/312 |
| 2013/0109375 A1* | 5/2013 | Zeiler | ..................... | G01S 19/16 455/552.1 |
| 2014/0081925 A1* | 3/2014 | Haeberle | ............... | G06F 16/174 707/E17.009 |
| 2016/0364687 A1 | 12/2016 | Matson et al. | | |
| 2021/0359444 A1 | 11/2021 | Lienau et al. | | |
| 2021/0360775 A1 | 11/2021 | Smith et al. | | |
| 2022/0287172 A1 | 9/2022 | Lienau et al. | | |

* cited by examiner

*Primary Examiner* — Omeed Alizada
(74) *Attorney, Agent, or Firm* — Quarles & Brady LLP

(57) ABSTRACT

A system and method for power tool device communication is provided. The method can include receiving, at a gateway device, data from a power tool device via a plurality of broadcast messages. The method can further include identifying redundant data within the plurality of broadcast messages. Additionally, the method can include generating a consolidated message corresponding to the power tool device, the consolidated message excluding the redundant data. The method can further include transmitting the consolidated message to a remote server via a network.

22 Claims, 4 Drawing Sheets

SYSTEMS AND METHODS FOR POWER TOOL COMMUNICATION

RELATED APPLICATIONS

The present application is based on and claims priority from U.S. Patent Application No. 63/242,727, filed on Sep. 10, 2021, the entire disclosure of which is incorporated herein by reference.

BACKGROUND

Work tools (e.g., power tools) allow operators to implement various functionalities on many different components (e.g., electrical wires, power cables, sheet metal, etc.). For example, some cutting tools can include a cutting head that is driven (e.g., hydraulically, or electrically) into a component, such as a power wire, to cut through the component.

SUMMARY

Some embodiments of the disclosure provide a gateway device for communication with a power tool device. The gateway device can include a communications interface configured to communicate with the power tool device and a network. The gateway device can further include an electronic controller including a processor. The electronic controller can be configured to receive data from the power tool device via a plurality of broadcast messages, and identify redundant data. The electronic controller can be further configured to generate a consolidated message excluding the redundant data. Additionally, the electronic controller can transmit the consolidated message via the network.

Some embodiments of the disclosure provide a method for power tool device communication. The method can include receiving, at a gateway device, data from a power tool device via a plurality of broadcast messages. The method can further include identifying redundant data within the plurality of broadcast messages. Additionally, the method can include generating a consolidated message corresponding to the power tool device, the consolidated message excluding the redundant data. The method can further include transmitting the consolidated message to a remote server via a network.

BRIEF DESCRIPTION OF THE DRAWINGS

The accompanying drawings, which are incorporated in and form a part of this specification, illustrate embodiments of the disclosure and, together with the description, serve to explain principles of the embodiments.

DETAILED DESCRIPTION

Figure 1:
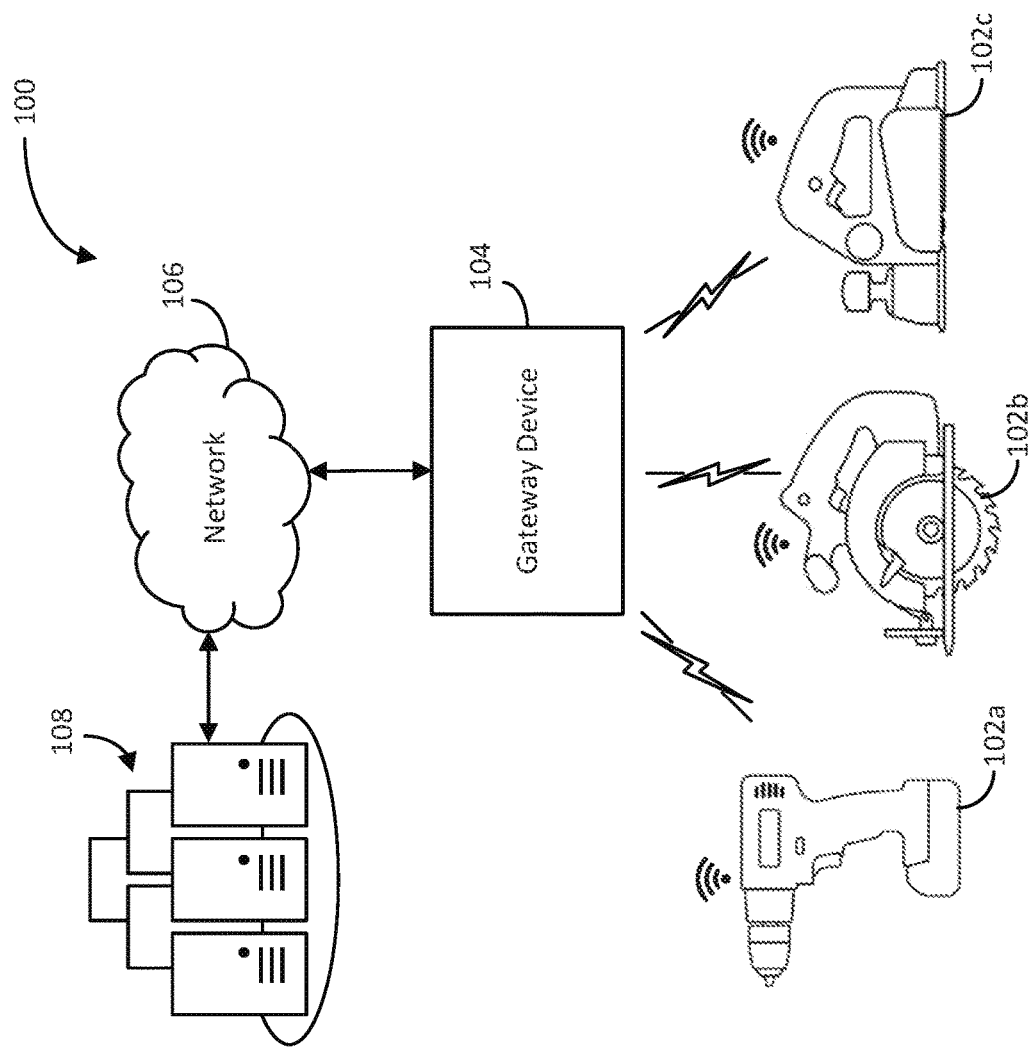
FIG. 1 is a schematic illustration of a power tool system, in accordance with embodiments of the present disclosure.

As described above, power tools generally can implement various functionalities on different components. For example, power tools generally can include an actuator including a moveable component that when moved into contact with the component, implements some kind of functionality on the component. For example, s when the power tool is implemented as a cutting tool, the actuator of the cutting tool can include a cutting head that can, when moved into contact with a work piece (e.g., a wire to be cut) sever the work piece in two. As another example, when the power tool is implemented as a crimping tool, the actuator of the crimping tool can include a crimping head that can, when moved into contact with a work piece (e.g., a wire to be crimped), crimp the work piece (e.g., to create an electrical connection to the wire). As another example, when the power tool is a drill-driver, the actuator of the power tool may be a drill chuck configured to accept and retain a drill or driver bit and that is driven by the power tool to rotate the retained bit to, for example, drill a hole in a workpiece (in the case of a drill bit) or drive a fastener into a workpiece (in the case of a drive bit).

Some power tools can include an electronic controller that can control various features of the tool. For example, the electronic controller can drive extension (or rotation or oscillation) of the actuator to implement a functionality on a work piece, or can drive retraction (or rotation in the opposing direction) of the actuator (e.g., after the functionality has been completed or to remove a fastener). In some embodiments, the electronic controller of the power tool can receive data from sensors of the power tool, which can augment the control of the actuator and/or be stored for later retrieval or export.

In some embodiments, each power tool of the presently disclosed power tool system can include one or more transceivers (e.g., as part of one or more Bluetooth® wireless modules) that are capable of communicating with other devices (e.g., other power tools) according to a Bluetooth® wireless protocol, which can have advantages as compared to other wireless protocols (e.g., using less power to communicate, providing fast communication speeds, ensuring one-to-one pairing between devices at some times, etc.).

In some embodiments, a gateway device can be in communication with each power tool, directly or via another power tool, using a first wireless communication protocol. The gateway device can receive power tool data from one or more power tools via this first wireless communication protocol. In some embodiments, the gateway device can further transmit the received power tool data over a network to a remote server (e.g., a cloud-based server) using a second communication protocol (e.g., cellular protocol or Wi-Fi®). The remote server can provide certain functions such as data analysis, summary, and storage. Accordingly, the gateway device generally serves as a bridge between the power tools and the remote server.

In some configurations, the gateway device can be configured to listen for messages (e.g., broadcast messages) from the power tools. Upon receiving a broadcast message, the gateway device can "push" the received data directly to the remote server (e.g., via cellular messages). As an example, a power tool can send a beacon message every 100 milliseconds, which means the gateway device will transmit a message to the remote server at a similar rate. Further, worksites often use a large number of power tools, each of which can be configured to send frequent beacon messages which are received by the gateway device.

Although real-time "push" messages from the gateway device can provide the data to the remote server relatively quickly, there are costs associated with this method. Specifically, the gateway device sends a large amount of redundant data to the remote server. The redundant data leads to significantly more communications to, and processing at, the remote server (e.g., sorting through redundant data and a substantial number of received messages). The increased communications can use more device and network resources (e.g., power, bandwidth, etc.). The increased processing at the remote server can use further resources still (e.g., power, processors, etc.). These additional resources can also increase data storage and transmission costs. As an example, in terms of cloud-based servers, computing costs can consume 60% or more of the total "cloud" cost. The next largest portion, bandwidth, can be as high as 20% depending on how much data is moving between the on-premises systems and the cloud provider.

Some embodiments described herein provide solutions to these problems (and others) by providing improved systems and methods for power tool communication and management. For example, some embodiments of the disclosure provide a power tool system that can include a plurality of power tools, each with a tool identification associated therewith, and a gateway device. The gateway device can communicate with each of the plurality of power tools, analyze and consolidate received messages, and subsequently transmit consolidated information to the remote server (i.e., via the network).

In some embodiments, the gateway device can transmit information to the remote server at predetermined intervals of time (e.g., once per hour, once per day, once per month). As an example, the gateway device can provide real-time operational data (corresponding to a power tool) to the remote server each hour. The gateway device can further provide a use summary to the remote server each day (or at another interval). These and other features of the present disclosure are discussed in greater detail below, and with respect to FIGS. 1-4.

Figure 2:
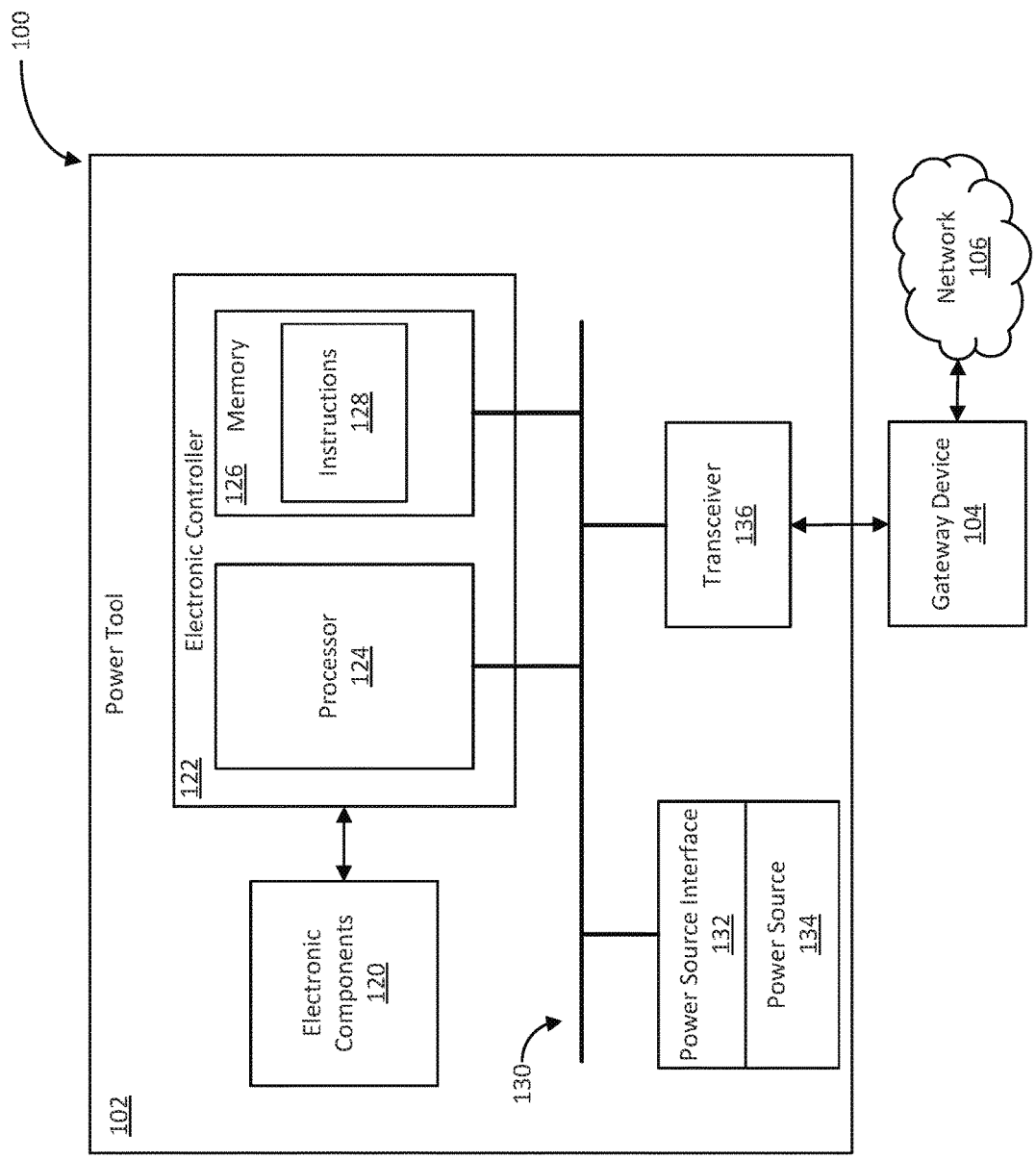
FIG. 2 is a block diagram of a power tool associated with the power tool system of FIG. 1, in accordance with embodiments of the present disclosure.

FIG. 1 shows a schematic illustration of a power tool system 100. The power tool system 100 can include one or more power tools (e.g., power tools 102a, 102b, 102c), a gateway device 104, a network 106, and a remote server 108. The power tools 102a, 102b, and 102c may be generically referred to as a power tool 102 (as also shown in FIG. 2) and collectively referred to as the power tools 102. As shown in FIG. 1, gateway device 104 can be configured to communicate directly with each power tool 102a, 102b, 102c. Further, the gateway device 104 can be configured to communicate with the remote server 108, via the network 106.

In some embodiments, the gateway device 104 can be implemented in different ways. For example, the gateway device 104 can include components such as a processor, memory, a display, inputs (e.g., a keyboard, a mouse, a graphical user interface, a touch-screen display, one or more actuatable buttons, etc.), communication devices (e.g., an antenna and appropriate corresponding circuitry), etc. In some embodiments, the gateway device 104 can simply be implemented as a processor. In some specific embodiments, the gateway device 104 can be implemented as a mobile phone (e.g., a smart phone), a personal digital assistant ("PDA"), a laptop, a notebook, a netbook computer, a tablet computing device, etc. In some embodiments, the gateway device 104 can include a power source (e.g., an AC power source, a DC power source, etc.), which can be in electrical communication with one or more power outlets (e.g., AC or DC outlets) and/or one or more charging ports (e.g., for charging a battery pack of a power tool). Thus, in some cases, the gateway device 104 can be a portable power supply and/or a charging device for one or more power tools.

In some embodiments, the gateway device 104 can be implemented as a Wi-Fi® router, hub, or other access point.

Each power tool 102a, 102b, 102c may include an actuator, a power source (e.g., a battery pack), an electronic controller, a power source interface (e.g., a battery pack interface), etc. In some cases, each power tool 102a, 102b, 102c can be different (as representatively illustrated by FIG. 1), can be the same, etc. For example, one or more of the power tools 102a, 102b, 102c can be an impact driver, a power drill, a hammer drill, a pipe cutter, a sander, a nailer, a grease gun, a crimper, any other suitable tool that can be configured to transmit data, etc. Regardless of the configuration, each power tool 102a, 102b, 102c can be configured to directly communicate with each other (e.g., over a wireless communication channel), and/or with the gateway device 104. In some configurations, each power tool 102a, 102b, 102c can directly communicate with each other, and/or with the gateway device 104, according to a wireless communications protocol. As a non-limiting example, the protocol can be a Bluetooth®, Zigbee, or Wi-Fi® wireless protocol.

In some embodiments, each power tool 102a, 102b, 102c can include a tool identifier associated therewith, each of which uniquely identifies the respective power tool from other power tools. For example, the tool identifier can be a media access control ("MAC") address, other unique identification information, etc. As another example, the tool identifier can be a user-friendly and/or user-defined name (e.g., identifying the type of power tool), such as Alice's nailer or Bob's impact driver.

As mentioned above, the power tool system 100 can include the network 106, and the remote server 108. Generally, the gateway device 104 can communicate with the remote server 108 via the network 106. More particularly, the gateway device 104 can communicate with an access point of the network 106 to communicate with the remote server 108 over the network 106. An access point can include, for example, a cellular tower or a Wi-Fi® router.

The remote server 108 can store tool data for various power tools (e.g., the power tools of the power tool system 100) including configuration data for the power tools (e.g., to configure operational parameters of the power tool), usage data for the power tools (e.g., number of hours of available operation for a power tool), maintenance data for the power tools (e.g. a log of prior maintenance, suggestions for future maintenance, etc.), operator (and owner) information for the power tools, location data for the power tools (e.g., for inventory management and tracking), among other data. In some cases, power tools 102 of the power tool system 100 can periodically or occasionally attempt to communicate one or more types of tool data back to the remote server 108, or to otherwise communicate with the remote server 108 or access points of the power tool system 100.

The particular number, types, and locations of components with the power tool system 100 of FIG. 1 are merely used as an example for discussion purposes, and thus additional or different types of power tools, access points, networks, and servers can be present in other embodiments of the power tool system 100. As an example, the power tool system 100 can include one or more other wireless communication devices that can be in communication with the power tools of the power tool system 100, and/or the gateway device 104. In some cases, each of these wireless communication devices can include a power source, an antenna, a receiver, an electronic controller, etc., and each of these can be configured to communicate according to a Bluetooth® Zigbee, Wi-Fi®, or another example of a wireless protocol.

Referring now to FIG. 2, a block diagram of an example power tool 102 within the power tool system 100 is shown, in accordance with embodiments of the present disclosure. The power tool 102 of FIG. 2 is representative of some examples of one or more of the power tools 102a, 102b, and 102c of FIG. 1. As shown, the power tool 102 can include electronic components 120, an electronic controller 122, a power source 134, and a transceiver 136. The electronic controller 122 can include a processor 124 and a memory 126. The processor 124, the memory 126, and the transceiver 136 can communicate over one or more control buses, data buses, etc., which can include a device communication bus 130. The memory 126 can include read-only memory (ROM), random access memory (RAM), other non-transitory computer-readable media, or a combination thereof. The memory 126 can include instructions 128 for the processor 124 to execute. The processor 124 can be configured to communicate with the memory 126 to store data and retrieve stored data. The processor 124 can be configured to receive instructions and data from the memory 126 and execute, among other things, the instructions. For example, the processor 124 may retrieve and execute the instructions 128 stored in the memory 126. Thus, at least through execution of the instructions 128, the electronic controller 122 can be configured to control or perform the various functions of the power tool 102 described herein.

The transceiver 136 can be communicatively coupled to the electronic controller 122. The transceiver 136 enables the electronic controller 122 (and, thus, the power tool 102) to communicate with other devices, such as a cellular tower, a Wi-Fi® router, a mobile device, other power tools, etc. In some examples, the transceiver 136 can further include a global navigation satellite system (GNSS) receiver configured to receive signals from GNSS satellites, land-based transmitters, etc. As shown by FIG. 2, the transceiver 136 can be configured to communicate (e.g., wirelessly) with the gateway device 104. In some examples, the transceiver 136 may include multiple transceivers, each associated with a particular communication protocol. Each such transceiver may include a driver circuit and an antenna. A driver circuit may receive signals to be transmitted from the electronic controller 122 over a wired connection and drives the antenna to transmit the signals as radio signals according to its associated communication protocol, and/or may receive radio signals from external devices via the antenna and provides the received signals to the electronic controller 122 via a wired connection. In some cases, two or more transceivers may share use of an antenna for transmitting and/or receiving radio signals.

In some embodiments, the power tool 102 also optionally includes a power source interface 132 that is configured to selectively receive and interface with a power source 134 (e.g., a power tool battery pack). The power source interface 132 can include one or more power terminals and, in some cases, one or more communication terminals that interface with respective power terminals, communication terminals, etc., of the power source 134. The power source 134 can include a housing containing or supporting one or more battery cells selected from one of various chemistries, such as lithium-ion (Li-Ion), nickel cadmium (Ni-Cad), etc. The power source 134 can further selectively latch and unlatch (e.g., with a spring-biased latching mechanism) to the power tool 102 to prevent unintentional detachment. The power source 134 can further include a pack electronic controller (pack controller) including a processor and a memory. The pack controller can be configured similarly to the electronic controller 122 of the power tool 102. The pack controller can be configured to regulate charging and discharging of the battery cells, and/or to communicate with the electronic controller 122. In some embodiments, the power source 134 can further include a transceiver, similar to the transceiver 136, coupled to the pack controller via a bus similar to the device communication bus 130. Accordingly, the pack controller, and thus the power source 134, can be configured to communicate with other devices, such as the cellular tower, the Wi-Fi® router, the mobile device, or other power tools. In some embodiments, the memory of the pack controller can include instructions (e.g., the same or similar to the instructions 128). Accordingly, the power source 134 can effectively perform similarly to the power tool 102 in terms of communication within the system 100, periodically broadcasting pack information to the gateway device 104 (e.g., with a pack identifier, state of charge information, pack type, number of charges, number of discharges, etc.). The power source 134 can further include, for example, a charge level fuel gauge, analog front ends, sensors, etc.

The power source 134 can be coupled to and configured to power the various components of the power tool 102, such as the electronic controller 122, the transceiver 136, and the electronic components 120. However, to simplify the illustration, power line connections between the power source 134 and these components are not illustrated.

In some embodiments, the power tool 102 also optionally includes additional electronic components 120. For a motorized power tool (e.g., drill-driver, saw, etc.), the electronic components 120 can include, for example, an inverter bridge, a motor (e.g., brushed or brushless) for driving a tool implement, etc. For a non-motorized power tool (e.g., a work light, a work radio, ruggedized tracking device, a laser level, a laser distance measurer, battery pack chargers, portable power supplies, etc.), the electronic components 120 can include, for example, one or more of a lighting element (e.g., an LED, a laser, etc.), an audio element (e.g., a speaker), a sensor (e.g., a light sensor, ultrasound sensor, etc.), a power source, charging circuitry, power conversion circuitry, etc. In some examples, the gateway device 104 may be considered a particular example of a non-motorized power tool.

In some embodiments, the transceiver 136 can be within a separate housing along with the electronic controller 122 or another electronic controller, and that separate housing can selectively attach to the power tool 102. For example, the separate housing may attach to an outside surface of the power tool 102 or may be inserted into a receptacle of the power tool 102. Accordingly, the wireless communication capabilities of the power tool 102 can reside in part on a selectively attachable communication device, rather than integrated into the power tool 102. Such selectively attachable communication devices can include electrical terminals that engage with reciprocal electrical terminals of the power tool 102 to enable communication between the respective devices and enable the power tool 102 to provide power to the selectively attachable communication device. In other embodiments, the transceiver 136 can be integrated into the power tool 102.

The block diagram (and accompanying description) of FIG. 2 may also apply to some embodiments of the power source 134, except that, in a power tool battery pack implementation, the power source interface 132 and the power source 134 of the diagram can be replaced with a tool interface (e.g., to interface with a power source interface of a power tool). In the case of the power tool battery pack implementation, the electronic component 120 can include, for example, one or more battery cells, a charge level fuel gauge, analog front ends, sensors, etc.

Figure 3:
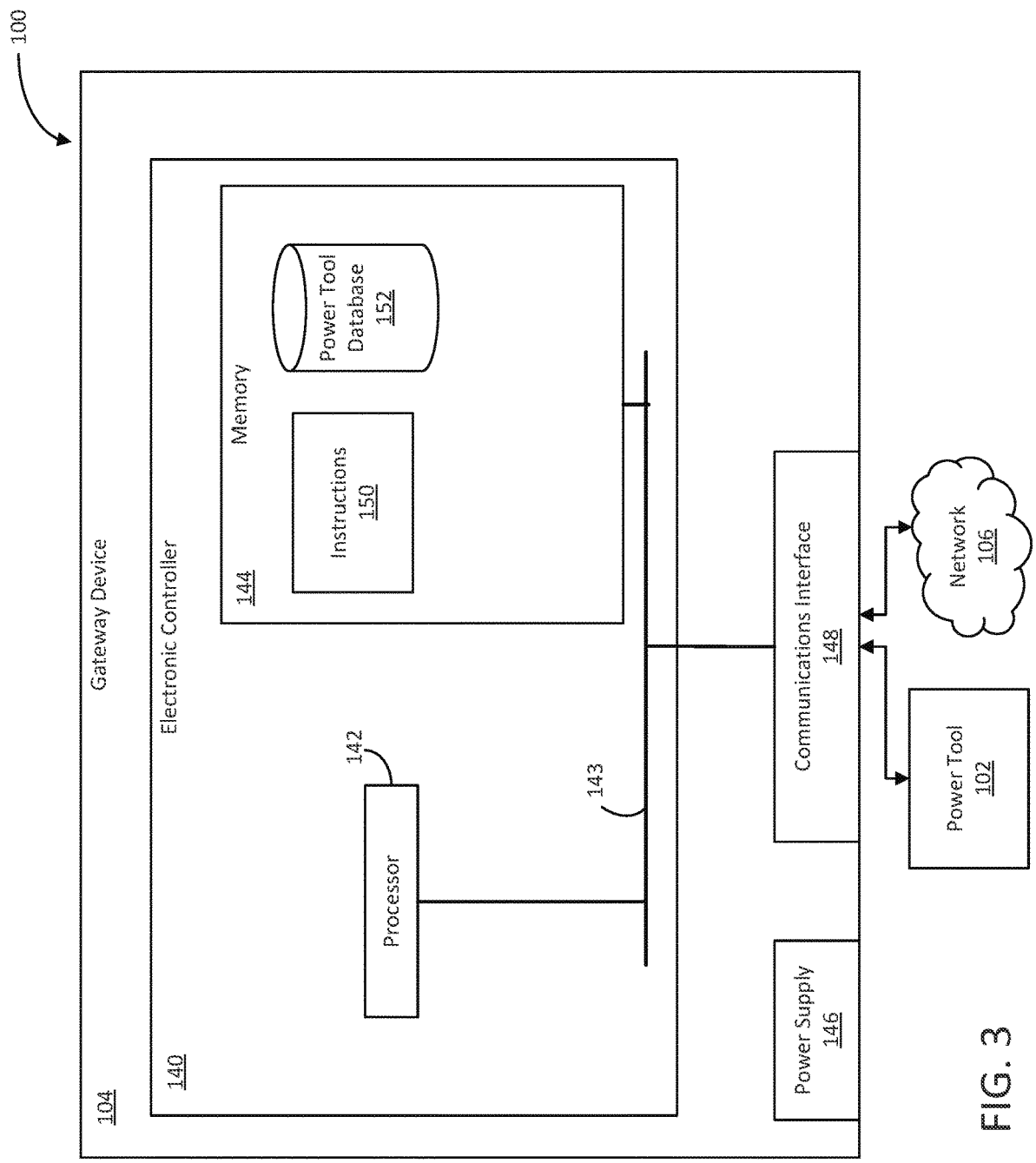
FIG. 3 is a block diagram of a gateway device associated with the power tool system of FIG. 1, in accordance with embodiments of the present disclosure.

Referring now to FIG. 3, a block diagram illustrating the gateway device 104 in greater detail is shown, according to an example embodiment. The gateway device 104 can be located within a worksite and can be configured to communicate with the power tools(s) 102, and the network 106.

A communications interface 148 can include wired or wireless interfaces (e.g., jacks, antennas, transmitters, receivers, transceivers, wire terminals, etc.) for conducting electronic data communications with the power tools 102, the network 106, or other external systems or devices. Such communications can be direct (e.g., local wired or wireless communications) or via a communications network (e.g., a WAN, the Internet, a cellular network, etc.). For example, the communications interface 148 can include an Ethernet card and port for sending and receiving data via an Ethernet-based communications link or network. In some examples, the communications interface 148 can include one or more of a Wi-Fi® transceiver or a cellular or mobile phone communications transceiver for communicating via a wireless communications network. In some examples, the communications interface 148 can include one or more of a Bluetooth® transceiver, Zigbee transceiver, or a Wi-Fi® transceiver for communicating with the power tools 102. The communications interface 148 can be communicably connected to the electronic controller 140 via a communication bus 143 such that the electronic controller 140 and the various components thereof can send and receive data via the communications interface 148.

In some embodiments, the gateway device 104 can include additional electronic components such as amplifiers, a display (e.g., an LCD display, a touch screen display), inputs (e.g., a keypad, a touch screen, a keyboard, a mouse, etc.), outputs, etc. In some embodiments, a power supply 146 (as shown by FIG. 3) can be a battery, an electrical cable (e.g., coupled to an AC wall outlet or other source), etc. As noted above, in some embodiments, the gateway device 104 is implemented as a portable power supply for powering power tools and/or a power tool battery charging device (i.e., a power tool battery charger). For example, in the case of a portable power supply implementation, the gateway device 104 may receive one or more power tool battery packs as a power source and may provide as output power. The output power may include output DC power to one or more DC ports, output AC power to one or more AC ports, or a combination thereof. To generate the output AC power, the portable power supply may include an inverter (e.g., a switching inverter including a bridge of field effect transistors controlled to generate AC power output from DC power input from the one or more power tool battery packs. In the case of the gateway device 104 being implemented as charging device, the gateway device 104 may include an AC input for coupling to an AC source (e.g., an AC grid-connected wall outlet), a rectifier to generate DC charging power from the AC input, and one or more charging receptacles each configured to receive a power tool battery pack to be charged. The gateway device 104 may supply the charging power to each coupled power tool battery pack via terminals of the corresponding charging receptacle to charge the power tool battery pack.

The electronic controller 140 is shown to include a processor 142 and a memory 144. The processor 142 can be implemented as a programmable processor, an application specific integrated circuit (ASIC), one or more field programmable gate arrays (FPGAs), a group of processing components, or other suitable electronic processing components. The memory 144 (e.g., memory, memory unit, storage device, etc.) can include one or more devices (e.g., RAM, ROM, Flash memory, hard disk storage, etc.) for storing data and/or computer code for completing or facilitating the various processes, layers and modules described herein. The memory 144 can be or include volatile memory or non-volatile memory. The memory 144 can include database components, object code components, script components, or any other type of information structure for supporting the various activities and information structures described in the present application. According to an examples embodiment, the memory 144 is communicably connected to the processor 142 via a communication bus 143, which may be similar to the bus 130 of FIG. 2. The memory 144 can include instructions 150 for the processor 142 to execute and a power tool database 152. The processor 142 can be configured to communicate with the memory 144 to store data and retrieve stored data (e.g., in the power tool database 152). The processor 142 can be configured to receive instructions and data from the memory 144 and execute, among other things, the instructions. For example, the processor 142 may retrieve and execute the instructions 150 stored in the memory 144. Thus, at least through execution of the instructions 150, the electronic controller 140 can be configured to control or perform the various functions of the gateway device 104 described herein, including performing one or more of the processes described herein (e.g., the process 400 of FIG. 4). The instructions 150 may include communication instructions (to enable the controller 140 to communicate with power tools 102 and the network 106 via the communication interface 148), database instructions (to enable the controller 140 to store and retrieve power tool data from the power tool database 152), consolidation instructions (to enable the controller 140 to consolidate tool data and/or identify redundant data for one or more of the power tools 102), and report instructions (to enable the controller 140 to generate reports related to one or more of the power tools 102). In some embodiments, the processor 142 includes one or more circuits or hardware elements to perform some or all of the functionality (or blocks of the process 400), in place of or in addition to performing such functionally through execution of the instructions.

In some embodiments, the power tool database 152 may store information, such as tool data for one or more of the power tools 102 in the system 100. The tool data may be indexed in the power tool database 152 according to a tool identifier for each power tool 102. For example, the processor 142 may access tool data for a particular power tool 102 by accessing the power tool database 152 with a tool identifier associated with the particular power tool 102. Similarly, the processor 142 may store tool data for a particular power tool 102 by storing the tool data in the power tool database 152 with an association to a tool identifier of the particular power tool 102.

Figure 4:
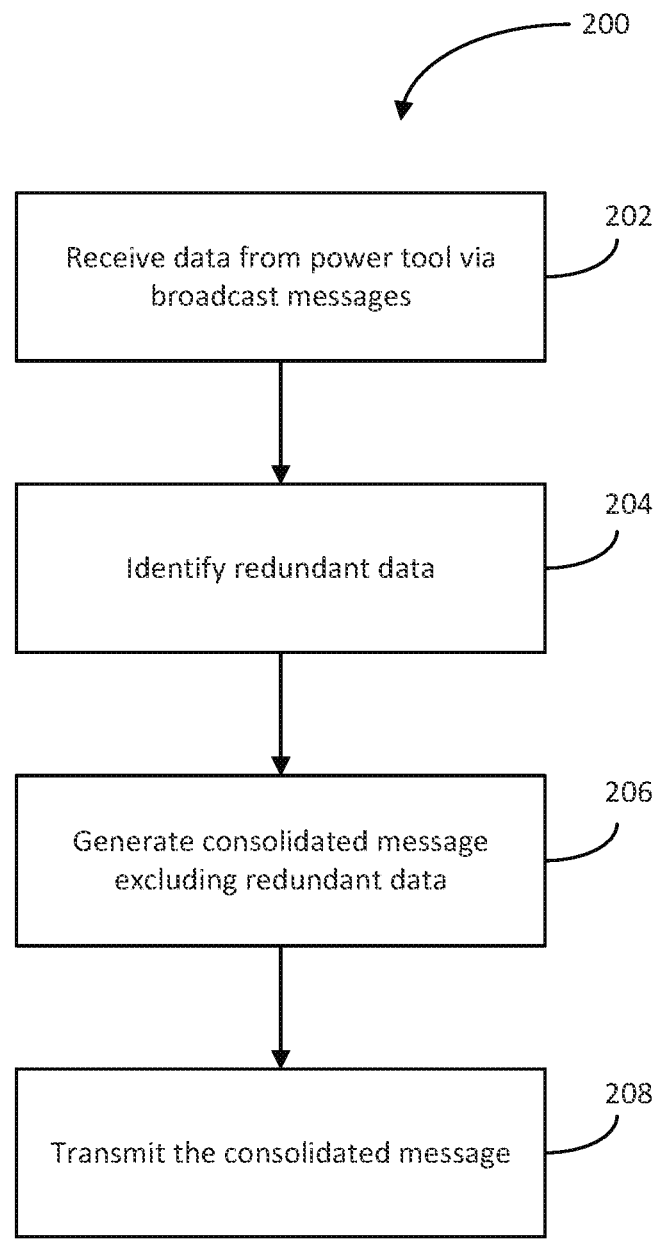
FIG. 4 is a flowchart of a process for power tool communication, in accordance with embodiments of the present disclosure.

FIG. 4 illustrates a flowchart of a process 200 for power tool communication, which can be implemented using any of the systems described herein (e.g., the power tool system 100). However, in some embodiments, the process 200 is implemented by another system having additional components, fewer components, alternative components, etc. In some specific cases, the process 200 can be implemented using a gateway device (e.g., the gateway device 104). Additionally, although the blocks of the process 200 are illustrated in a particular order, in some embodiments, one or more of the blocks can be executed partially or entirely in parallel, can be executed in a different order than illustrated in FIG. 4, or can be bypassed. For illustration purposes, the process 200 is generally described as being implemented by the gateway device 104 in the context of the power tool system 100. However, in other embodiments, other devices or power tools of the power tool system 100 (e.g., one of the power tools 102), or other power tools or devices of other systems, may implement the process 200.

At block 202, the gateway device 104 receives data from a power tool (e.g., a power tool 102) via broadcast messages. For example, in some embodiments, the electronic controller 140 corresponding to the gateway device 104 can be configured to execute block 202. In particular, the electronic controller 140 can receive the broadcast messages from the power tool 102 via the communications interface 148. As illustrated by FIG. 3, for example, the communications interface 148 can communicate the broadcast messages to the electronic controller 140 via the communication bus 143. The broadcast messages may be transmitted and received according to a first wireless communication protocol. The first wireless communication protocol may be a short-range communication protocol for communications of, for example, less than 50 meters, 30 meters, 20 meters, or 10 meters. For example, the first wireless communication protocol may be a Bluetooth® protocol, Zigbee protocol, or Wi-Fi® protocol.

The data of each broadcast message may include or indicate tool data. The tool data may include one or more of a tool identifier of the power tool 102, a duration (e.g., quantity of seconds) of operation of the power tool 102, a battery state of charge of the power tool 102, a quantity of operations of the power tool 102, power output of the power tool 102, location of the power tool 102, current settings of the power tool 102, wireless signal strength (e.g., of the broadcast message), among other information types. In some embodiments, the electronic controller 140 can be further configured to identify the power tool 102 associated with the broadcast messages by extracting a power tool identifier of the power tool 102 from the broadcast messages. The electronic controller 140 may further store the tool data, or a portion thereof, in the power tool database 152. The tool data may be stored or indexed in the power tool database 152 in a manner that links or otherwise associates the tool data with the tool identifier (and, thus, the power tool 102) and/or the particular broadcast message with which the tool data was sent (e.g., using a time stamp or broadcast message identifier).

At block 204, the gateway device 104 identifies redundant data within the broadcast messages. Stated another way, the gateway device 104 may identify a portion of the data received via the broadcast messages as redundant data. For example, at block 204, the electronic controller 140 may access the power tool database 152 to retrieve and/or analyze the tool data stored for the power tool 102 based on the broadcast messages received at block 202. The electronic controller 140 may then compare the tool data from different instances of the broadcast messages (e.g., compare tool data from a first broadcast message to tool data from a second broadcast message). In response to matching (e.g., identical) tool data from multiple instances of broadcast messages, the electronic controller 140 may identify all but one copy of the tool data as redundant data. In some examples, in response to a portion of the tool data matching from multiple instances of broadcast messages, the electronic controller 140 may identify all but one copy of the portion of the tool data as redundant data. In some examples, the electronic controller 140 identifies tool data most recently received by the gateway device 104 from the power tool 102 (e.g., as part of the most recent broadcast message), and identifies the older tool data as redundant data. In some examples, electronic controller 140 identifies portions of tool data that were most recently received by the gateway device 104 from the power tool 102, and identifies those portions of tool data received in earlier (older) broadcast messages as redundant data.

In some embodiments, identifying the redundant data can be performed on data from a subset of the plurality of broadcast messages. As an example, the subset of messages can be selected based on a time that each message was received. In this way, messages received during a specified time interval (e.g., 1 hour) can be analyzed and consolidated independently of other time intervals. Additionally, in some embodiments, the identification of redundant data is limited to a specific power tool within a set of power tools (i.e., the power tool 102 referred to in block 202).

In some embodiments, block 204 may be performed in parallel with block 202. For example, with each received broadcast message (or a subset of broadcast messages), the electronic controller 140 may identify redundant data within the broadcast messages (received thus far).

At block 206, the electronic controller 140 generates a consolidated message that excludes the redundant data. For example, the electronic controller 140 may identify the tool data retrieved and/or analyzed in block 204, excluding the redundant data, to form consolidated tool data. The consolidated tool data may be included in the consolidated message. The consolidated message may be stored in a temporary storage element (e.g., a register or buffer) of the electronic controller 140.

In some embodiments, the consolidated message can correspond to a subset of the plurality of broadcast messages. As an example, the subset of messages can be based on a time that each message was received. In this way, messages received during a specified time interval (e.g., 1 hour) can be analyzed and consolidated independently of other time intervals. For example, the consolidated message can include the consolidated tool data from the specified time interval (e.g., extracted from data received via broadcast message between 9:00 am to 10:00 am of a particular day), and excluding the redundant data from that same specified time interval that was identified. Additionally, in some embodiments, the consolidated message can be limited to a specific power tool within a set of power tools (i.e., the power tool 102 referred to in block 202).

The consolidated message may have a format that is in accordance with a second communication protocol. In some embodiments, the second wireless communication protocol may generally have a longer range for wireless communications than the first wireless communication protocol. For example, the second wireless communication protocol may be a long-range communication protocol for communications of, for example, up to 50 meters, 100 meters, hundreds, or thousands of meters. For example, the second wireless communication protocol may be a Wi-Fi® protocol or a cellular protocol (e.g., 3G, 4G, 5G, etc.).

At block 208, the electronic controller 140 transmits the consolidated message via the network 106. For example, the electronic controller 140 may transmit the consolidated message via the communications interface 148 to an access point of the network 106. In some examples, the consolidated message is then transmitted via the network 106 to the remote server 108 for storage and/or additional analysis. The electronic controller 140 may transmit the consolidated message via the communications interface 148 in accordance with the second wireless communication protocol, which is different than the first wireless communication protocol.

In some embodiments, transmission of the consolidated message can occur at a predetermined interval of time. Although the predetermined interval of time can be user-defined, non-limiting example intervals include once per hour, once per day (e.g., at the end of the working day), etc. For example, the electronic controller 140 may receive broadcast messages for the duration (or a portion) of the interval in block 202, and then proceed to perform blocks 204 and 206, and ultimately to block 208 to transmit the consolidated message. The electronic controller 140 may then return to block 202 to begin receiving broadcast messages for a next interval, and proceed back through blocks 204, 206, and 208 to identify further redundant data in the broadcast messages for the next interval, generate a further consolidated message for the next interval that excludes the redundant data, and transmit the further consolidated message. By looping through the process 200 in this manner, the electronic controller 140 may transmit a consolidated message periodically at a frequency based on or defined by the predetermined time interval. In some embodiments, the predetermined interval is measured in quantity of received broadcast messages (e.g., 100 messages, 1000 message, etc.), rather than a time period. In some configurations, different tool types can have different predetermined intervals. As an example, high-use, high-cost power tools can have a shorter interval of time (i.e., information is provided more frequently to the remote server), whereas a low-use, low cost power tool can have a longer interval of time (i.e., information is provided less frequently to the remote server). Through this process, the quantity of messages and redundant data sent by the gateway device 104 through the network 106 is reduced.

In some embodiments of the process 200, block 204 can further include the electronic controller 140 identifying priority data from the received data (received in block 202). In response to identifying priority data, the electronic controller 140 can generate and transmit a priority message via the network 106 (i.e., irrespective of a predetermined interval of time for sending consolidated messages). For example, although a predetermined interval of time for sending a consolidated message may be once per hour or every 100 broadcast messages, the electronic controller 140 may generate and transmit the priority message before the predetermined interval elapses (e.g., before the end of the hour or before the threshold of 100 broadcast messages have been received). While priority data can be user-defined, non-limiting examples include: an unexpected location of the power tool, a fault-state of the power tool, data indicative of a maintenance emergency, data indicative of improper functioning of the power tool, etc.

In some embodiments, the process 200 (e.g., performed by the power tool system 100) can include additional steps. As an example, the process 200 can further include analyzing a plurality of consolidated messages (as generated) and/or broadcast messages, generating a report corresponding to a particular power tool 102, subset of power tools 102 in the system 100, or all power tools 102 in the system 100, and transmitting the report (e.g., via the network 106). In some configurations, the report can be transmitted at a predetermined interval of time (e.g., once per day, once per week, once per month, etc.). In some embodiments, the gateway device 104 transmits the report at a lower frequency than the consolidated messages. The report can include, for the predetermined interval of time, information such as: a total number of broadcast messages received from the power tool, an average signal (e.g., beacon) strength of the power tool, signal strength values of the power tool over time, and a summary of received real-time information for the power tool, among other things. The report can generally include health and maintenance summaries corresponding to the power tool.

Although the process 200 was described with respect to one power tool (e.g., the power tool 102), in some embodiments, the process 200 is performed with respect to more than one power tool 102. For example, in block 202, the electronic controller 140 may receive broadcast messages from each power tools of a plurality of power tools 102, each broadcast message including data from the particular power tool 102 that transmitted the broadcast message. Then, in block 204, the electronic controller 140 identifies redundant data from the data received via the broadcast messages from the power tools 102. In some embodiments, the electronic controller 140 analyzes the broadcast messages from each of the power tools 102, respectively, to identify redundant data for each of the power tools 102. In block 206, the electronic controller 140 generates a consolidated message for each of the power tools 102 in a similar manner as described above, but with each consolidated message excluding the redundant data identified for the particular power tool 102 associated with the consolidated message. In block 208, the electronic controller 140 transmits each of the consolidated messages (e.g., a respective consolidated message for each of the power tools 102). In some embodiments, the electronic controller 140 then returns to block 202 to repeat the process 200. Further, as described above, the electronic controller 140 may perform block 202 and receive broadcast messages for a predetermined interval before proceeding to block 204, thereby resulting in the electronic controller 140 periodically transmitting consolidated messages with a frequency defined by or based on the predetermined interval.

While the disclosure has been mainly framed around power tools, it is also contemplated that the embodiments of the disclosure can be applied to tools in general (e.g., both powered and non-powered tools), to power tool battery packs, and to power tool accessories. For example, the power tool system 100 may include one or more non-powered tools (e.g., a wrench, a screwdriver, a ratchet, other hand tools, etc.) or power tool accessories (e.g., toolboxes or other tool storage containers, personal protective equipment (e.g., work gloves, masks, protective eyewear or glasses, pads, helmets, and protective apparel)) that have attached thereto a power source (e.g., a battery) and a communication system. The communication system may include an electronic controller (similar to electronic controller 122) and a transceiver (similar to transceiver 136) to facilitate communication with other devices of the power tool system 100 (e.g., the gateway device 104 and power tools). In a specific case, the power source and the communication system can be coupled to a housing of a non-powered tool or power tool accessory or can be located within the housing of the non-powered tool (e.g., within the handle of the non-powered tool) or power tool accessory. Accordingly, such non-powered tools and power tool accessories may implement the process 200 of FIG. 4. Additionally, such non-powered tools and power tool accessories may broadcast messages with tool data as described with respect to the power tool 102 in block 202. Accordingly, in some embodiments, the gateway device 104 may perform the process 200 with respect to data received from a non-power tool (e.g., resulting in the transmission of a consolidated message for the non-powered tool), with respect to data received from a power tool accessory, or a combination thereof. Additionally, power tool battery packs may broadcast messages with pack data, in a similar manner as power tools broadcast messages with tool data as described with respect to the power tool 102 in block 202. Accordingly, in some embodiments, the gateway device 104 may perform the process 200 with respect to pack data received from a power tool battery pack (e.g., resulting in the transmission of a consolidated message for the power tool battery pack). The term power tool device may be used to refer to a power tool (e.g., the power tool 102), whether motorized or non-motorized, and/or to refer to a power tool battery pack (e.g., serving as the power source 134) that can attach to and power a power tool. Accordingly, in some embodiments, the gateway device 104 may perform the process 200 with respect to power tool device data received from a power tool device (e.g., resulting in the transmission of a consolidated message for the power tool device).

Further, as noted above, the gateway device 104 may perform the process 200 with respect to more than one power tool 102. Similarly, the gateway device 104 may perform the process 200 with respect to one or more power tools 102, one or more power tool battery packs, and/or one or more a non-powered tools. Thus, the gateway device 104 may generate consolidated messages for various combinations of power tools, battery packs, and non-powered tools.

It is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature can sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

In some embodiments, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.). Also, functions performed by multiple components can be consolidated and performed by a single component. Similarly, the functions described herein as being performed by one component can be performed by multiple components in a distributed manner. Additionally, a component described as performing particular functionality can also perform additional functionality not described herein. For example, a device or structure that is "configured" in a certain way is configured in at least that way, but can also be configured in ways that are not listed.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications can be made to these configurations without departing from the scope or spirit of the claimed subject matter.

Certain operations of methods according to the disclosure, or of systems executing those methods, can be represented schematically in the figures or otherwise discussed herein. Unless otherwise specified or limited, representation in the figures of particular operations in particular spatial order can not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," etc. are intended to encompass part or all of computer-related systems that include hardware, software, a combination of hardware and software, or software in execution. For example, a component can be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) can reside within a process or thread of execution, can be localized on one computer, can be distributed between two or more computers or other processor devices, or can be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions can be used to discuss aspects of a particular example or figure, but do not necessarily require similar orientation or geometry in all installations or configurations.

As used herein, unless otherwise defined or limited, the phase "and/or" used with two or more items is intended to cover the items individually and the items together. For example, a device having "a and/or b" is intended to cover: a device having a (but not b); a device having b (but not a); and a device having both a and b.

This discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The following detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

Various features and advantages of the disclosure are set forth in the following claims.

The invention claimed is:

1. A gateway device for communication with a power tool device, the gateway device comprising:
   a communications interface configured to communicate with the power tool device and a network; and
   an electronic controller including a processor, the electronic controller configured to:
      receive power tool operational data from the power tool device via a plurality of broadcast messages;
      identify redundant power tool operational data within the plurality of broadcast messages;
      generate a consolidated message excluding the redundant power tool operational data; and
      transmit the consolidated message to a remote server via the network.

2. The gateway device of claim 1, wherein identifying the redundant power tool operational data and generating the consolidated message corresponds to a subset of the plurality of broadcast messages.

3. The gateway device of claim 2, wherein the electronic controller is configured to select the subset of the plurality of broadcast messages based on a time of receipt.

4. The gateway device of claim 1, wherein the electronic controller is configured to transmit the consolidated message to the remote server via the network at a predetermined interval of time.

5. The gateway device of claim 4, wherein the electronic controller is further configured to:
   identify priority power tool operational data from the power tool operational data received; and
   in response to identifying priority power tool operational data, generate and transmit a priority message to the remote server via the network irrespective of the predetermined interval of time.

6. The gateway device of claim 1, wherein the electronic controller is further configured to:
   analyze at least one of a plurality of consolidated messages generated by the electronic controller and the plurality of broadcast messages received from the power tool device;
   generate a report corresponding to the power tool device based on the analysis; and
   transmit the report to the remote server via the network.

7. The gateway device of claim 6, wherein the electronic controller is configured to transmit the report to the remote server via the network at a predetermined interval of time.

8. The gateway device of claim 7, wherein the electronic controller is configured to generate the report by determining, for a predetermined interval of time:
   a total number of broadcast messages received from the power tool device,
   an average signal strength of the power tool device,
   signal strength values of the power tool device over time, or
   a summary of received real-time information for the power tool device.

9. The gateway device of claim 1, wherein the power tool device is one of a plurality of power tool devices and the communications interface is configured to receive the power tool operational data from the plurality of power tool devices via the plurality of broadcast messages, the electronic controller further configured to:
   identify the power tool device of the plurality of power tool devices associated with each of the plurality of broadcast messages, and wherein the consolidated message corresponds to one power tool device of the plurality of power tool devices.

10. The gateway device of claim 1, wherein the electronic controller is further configured to:
receive the power tool operational data from the power tool device via the plurality of broadcast messages using a first communication protocol; and
transmit the consolidated message to the remote server via the network using a second communication protocol.

11. The gateway device of claim 1, wherein the electronic controller is further configured to:
receive further data from a non-powered tool or power tool accessory via a second plurality of broadcast messages;
identify further redundant data within the second plurality of broadcast messages;
generate a further consolidated message excluding the further redundant data; and
transmit the further consolidated message to the remote server via the network.

12. A method for power tool device communication, the method comprising:
receiving, by a gateway device, power tool operational data from a power tool device via a plurality of broadcast messages;
identifying, by the gateway device, redundant power tool operational data within the plurality of broadcast messages;
generating, by the gateway device, a consolidated message corresponding to the power tool device, the consolidated message excluding the redundant power tool operational data; and
transmitting, by the gateway device, the consolidated message to a remote server via a network.

13. The method of claim 12, wherein identifying the redundant power tool operational data and generating the consolidated message corresponds to a subset of the plurality of broadcast messages.

14. The method of claim 13, further comprising selecting, by the gateway device, the subset of the plurality of broadcast messages based on a time of receipt by the gateway device.

15. The method of claim 12, wherein the transmitting of the consolidated message by the gateway device to the remote server via the network occurs in accordance with a predetermined interval of time.

16. The method of claim 15, further comprising:
identifying, by the gateway device, priority power tool operational data from the power tool operational data received; and
in response to identifying the priority power tool operational data, generating and transmitting a priority message to the remote server via the network irrespective of the predetermined interval of time.

17. The method of claim 12, further comprising:
analyzing, by the gateway device, at least one of a plurality of consolidated messages generated by the gateway device and the plurality of broadcast messages received from the power tool device;
generating, by the gateway device, a report corresponding to the power tool device based on the analysis; and
transmitting, by the gateway device, the report to the remote server via the network.

18. The method of claim 17, wherein the transmitting of the report to the remote server via the network by the gateway device occurs in accordance with a predetermined interval of time.

19. The method of claim 18, wherein generating the report comprises determining, for the predetermined interval of time:
a total number of broadcast messages received from the power tool device,
an average signal strength of the power tool device,
signal strength values of the power tool device over time, or
a summary of received real-time information for the power tool device.

20. The method of claim 12, wherein the power tool device is one of a plurality of power tool devices, and the method further comprises:
receiving, by the gateway device, the power tool operational data from the plurality of power tool devices via the plurality of broadcast messages,
identifying, by the gateway device, for each broadcast message of the plurality of broadcast messages, an associated power tool device of the plurality of power tool devices associated with the broadcast message, and
wherein the consolidated message corresponds to one power tool device of the plurality of power tool devices.

21. The method of claim 12, further comprising:
receiving, by the gateway device, the power tool operational data from the power tool device via the plurality of broadcast messages using a first communication protocol; and
transmitting, by the gateway device, the consolidated message to the remote server via the network using a second communication protocol.

22. The method of claim 12, further comprising:
receiving, by the gateway device, further data from a non-powered tool or power tool accessory via a second plurality of broadcast messages;
identifying, by the gateway device, further redundant data within the second plurality of broadcast messages;
generating, by the gateway device, a further consolidated message excluding the further redundant data; and
transmitting, by the gateway device, the further consolidated message to the remote server via the network.

* * * * *